United States Patent
Tommer

(10) Patent No.: US 6,259,166 B1
(45) Date of Patent: Jul. 10, 2001

(54) GENERATOR WITH DOUBLE DRIVING MACHINERY

(75) Inventor: Josef Tommer, Würenlos (CH)

(73) Assignee: Asea Brown Boveri AG, Baden (CH)

(*) Notice: Subject to any disclaimer, the term of this patent is extended or adjusted under 35 U.S.C. 154(b) by 0 days.

(21) Appl. No.: 09/429,006

(22) Filed: Oct. 29, 1999

(30) Foreign Application Priority Data

Oct. 30, 1998 (DE) ............................................. 198 50 052

(51) Int. Cl.[7] .................................................... B60K 1/00
(52) U.S. Cl. ............................ 290/4 R; 310/232; 290/52
(58) Field of Search ................................. 290/1 C, 4 R, 290/4 A, 4 C, 52; 322/99, 100; 60/607, 608; 310/232

(56) References Cited

U.S. PATENT DOCUMENTS

| | | | |
|---|---|---|---|
| 3,585,473 | * 6/1971 | Huxtable | 318/140 |
| 3,697,763 | * 10/1972 | Middlebrook | 290/17 |
| 3,799,284 | * 3/1974 | Heder | 180/65 A |
| 4,484,083 | * 11/1984 | Jefferies | 290/45 |
| 4,769,993 | * 9/1988 | Kawamura | 60/597 |
| 4,814,699 | * 3/1989 | Koziel et al. | 324/158 MG |
| 4,862,009 | * 8/1989 | King | 290/22 |
| 5,739,618 | * 4/1998 | Kleinburger et al. | 310/232 |
| 5,886,505 | * 3/1999 | Giberson | 322/100 |
| 6,098,735 | * 8/2000 | Sadarangani et al. | 180/65.2 |

OTHER PUBLICATIONS

"Entwicklung der Getriebe bei zu erwartenden Leistungssteigerungen", *Allianz Report*, Feb. 1998, pp. 72–78.

Gard, Manfred, "Kombinierte Gasturbinen–Dampfturbinen–Kraftwerke", *Techn. Mitt. AEG–Telefunken 61*, 1971, vol. 3, pp. 149–153.

\* cited by examiner

*Primary Examiner*—Nicholas Ponomarenko
(74) *Attorney, Agent, or Firm*—Burns, Doane, Swecker & Mathis, L.L.P.

(57) ABSTRACT

A generator with double driving machinery. On one side of the generator, a gas turbine is coupled directly with a generator shaft. On the other side of the generator, opposite from the gas turbine, a steam turbine is connected via a transmission gear with the generator shaft. The transmission gear is situated between the generator shaft and a slip ring shaft of a slip ring unit. During operation, the slip ring shaft is not influenced by a torque stress formed by the steam turbine. The generator shaft and the slip ring shaft, as well as a first gear shaft, situated between the generator shaft and the slip ring shaft, are constructed at least partially as hollow shafts. The first gear shaft may also be constructed completely as a hollow shaft. The bores of the generator shaft, the slip ring shaft, and the first gear shaft hold an excitation conductor for transmitting an excitation current from the slip ring unit to the generator.

13 Claims, 2 Drawing Sheets

GENERATOR WITH DOUBLE DRIVING MACHINERY

The present invention relates to a generator with double driving machinery. This application claims priority under 35 U.S.C. §§119 and/or 365 to 198 50 052.1 filed in Germany on Oct. 30, 1998; the entire content of which is hereby incorporated by reference.

BACKGROUND OF THE INVENTION

Generators with double driving machinery are known, for example, from "Allianz Report," February, 1998, page 72, and are used in power plant installations. The generator is typically arranged in what is called a single-shaft system between a gas turbine and a steam turbine, as shown in FIG. 1.2 of the cited document. The generator also includes a slip ring unit electrically connected with it, which is located on the same shaft as the generator. In such single-shaft systems, static excitation devices are installed starting with an excitation current of greater than 2000 amps, whereby the static excitation devices supply the generator rotor winding via the slip ring unit with an excitation current of up to 7000 amps. Up to an excitation current of about 2000 amps, either static excitation devices or brushless excitation machines may be used on the generator shaft.

At least on one side or on both sides of the generator shaft, the generator is connected via a transmission gear with the gas turbine and the steam turbine. Such a transmission gear in this case functions, for example, as a frequency converter to adapt 60 Hz turbines (speed: 3600 rpm) to 50 Hz generators (speed: 3000 rpm), or as a converter that converts from a supersynchronous to a synchronous speed. In addition, an SSS coupling can be used between the steam turbine and the generator, whereupon a coupling of both machines will only be possible after they reach their operating speed.

It was found that in such conventional single-shaft systems with transmission gears, the performance is limited with respect to the mechanical and electrical design. The slip ring device or the slip ring shaft cannot be constructed with a desired diameter size, since the peripheral speed of the brush face at the slip rings is limited to approximately 80 m/s. Up to 80 m/s, a good contact with the brushes for transmitting the excitation current can be ensured. For a 60 Hz generator with 2-pole design, this limit of 80 m/s is reached with a slip ring diameter of 400 mm. A slip ring diameter of 400 mm permits a slip ring shaft diameter of approximately 290 mm. But the shaft diameter of 290 mm limits the maximum mechanical power transfer to approximately 100 MW turbine power if the shaft is manufactured from a steel suitable for generator rotors. This power transmission limit takes into account both the permanent moments to be transmitted by the shaft, and interference forces, such as missynchronizations and short-circuit cutoff.

Single-shaft systems of the known type require a special mechanical design of the shaft bearing which directly adjoins the slip ring unit. The entire torque of the steam turbine is transmitted via this shaft bearing to the generator, whereby the slip ring unit represents only a comparatively small weight load, and the shaft bearing therefore requires a correspondingly complex design.

In addition, a conventional slip ring shaft has, on one side, a coupling flange that has been worked in one piece from this shaft, and, on the other side, a welded-on or shrunk-on coupling that is attached to the slip ring shaft after the slip rings have been installed. The slip rings cannot be installed on a slip ring shaft over a coupling flange.

SUMMARY OF THE INVENTION

It is an object of the present invention to further develop a generator with double driving machinery of the initially mentioned type, in such a way that greater mechanical power can be transmitted from the driving machines to the generator shaft than is possible with previously known generators.

In particular, an object is to create a generator with double driving machinery in which greater mechanical power can be transmitted on the generator shaft on the side of the slip ring unit, and whereby the slip ring shaft and its bearing can be designed in a simpler manner.

According to the invention, the objects of the invention can be realized by providing a generator with double driving machinery that has between the generator shaft and the slip ring shaft a first gear shaft of a transmission gear, and that a driving machine on the side of the slip ring unit is, via a second gear shaft of the transmission gear, connected with the generator shaft.

It is especially advantageous if the torque transmitted by the driving machine on the side of the slip ring unit is delivered to the generator shaft without mechanical stress on the slip ring shaft. The dimensions of the slip ring shaft and of the slip rings themselves are, therefore, only subject to the electrical conditions for the various peripheral speeds. Furthermore, the slip ring shaft only has a coupling flange on one side, which makes slip rings easier to uninstall and reinstall.

It is particularly advantageous if the transmission gear is designed only for the mechanical torque transmission—and is in no way related to the electrical design of a slip ring unit.

With the transmission gear provided according to the present invention, between the generator and the slip ring unit, it is possible to markedly increase the mechanical power transmitted by a driving machine on the side of the slip ring unit, compared to the state of the art, without mechanically stressing the slip ring shaft.

Still other objects, features, and attendant advantages of the present invention will become apparent to those skilled in the art from a reading of the following detailed description of embodiments, taken in conjunction with the accompanying drawings.

BRIEF DESCRIPTION OF THE DRAWINGS

The following explains the invention in reference to the drawings. Only those elements essential for understanding the invention are shown in the drawing. For example, for reasons of clarity none of the shaft bearings are shown.

DETAILED DESCRIPTION OF THE PREFERRED EMBODIMENTS

Figure 1:
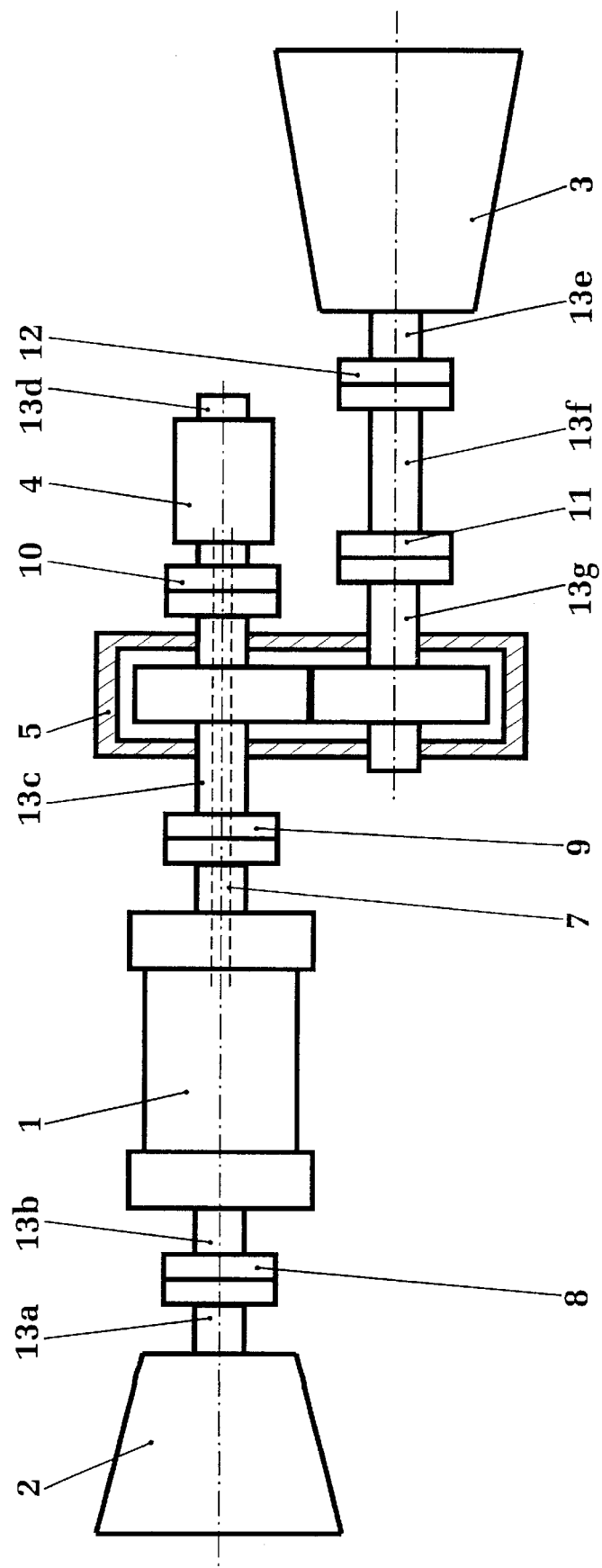
FIG. 1 shows a schematic view of a generator with double driving machinery according to a first preferred embodiment of the present invention.

FIG. 1 shows a generator 1 with double driving machinery according to a first preferred embodiment of the present invention. A generator shaft 13b is connected on both sides of the generator 1 with a driving machine, i.e., with a gas turbine 2 and a steam turbine 3. The gas turbine 2 is connected directly via a gas turbine shaft 13a and a coupling 8 to the generator shaft 13b. The steam turbine 3 is connected via a steam turbine shaft 13e, a coupling 12, an intermediate shaft 13f, a coupling 11, a first and second gear shaft 13c, 13g, and a coupling 9, with the generator shaft 13b. On a side opposite from the generator 1, the first gear shaft 13c is connected via a coupling 10 with a slip ring unit 4 in order to supply an excitation current to the generator 1.

The generator 1 and the slip ring unit 4, provided for transmitting the generator excitation current, are therefore separated from each other by means of the first gear shaft 13c. The torque generated by the steam turbine 3 is transferred via the transmission gear 5 to the generator shaft 13b between the slip ring unit 4 and the generator 1. Therefore, the slip ring unit 4 and associated slip ring shaft 13d are not subject to any torque stresses generated during operation. As a result, the design of the slip ring shaft 13d with respect to the slip rings provided on it (not shown) depends substantially on electrical requirements. The parameters for the electrical design of the slip ring unit 4 include essentially, the peripheral speed of the slip rings, which should not exceed 80 m/s, and the current density of the live brushes on the slip rings. Since the slip ring shaft 13d does not transmit any torque generated by the driving machine, it can have a simple bearing.

In addition to having torque stress eliminated from the slip ring shaft 13d, the slip ring shaft 13d is also advantageously equipped only on one side with a flange for the coupling 10. This means that the slip rings shrunk on the slip ring shaft 13d can be easily pulled off on the side of the slip ring shaft 13d opposite from the flange, if they become worn during operation.

The generator shaft 13b and the slip ring shaft 13d are in part constructed as a hollow shaft, and the first gear shaft 13c is completely constructed as a hollow shaft. An excitation conductor 7 (indicated by a broken line) is installed in the bores of the generator shaft 13b, the slip ring shaft 13d and the gear shaft 13c. The design of such an excitation conductor 7 in the form of a conductor rail is generally known and, thus, does not need to be explained in more detail. The excitation conductor 7 provides the electrical connection between the slip ring unit 4 and the generator 1 for an excitation current generated with static excitation.

Figure 2:
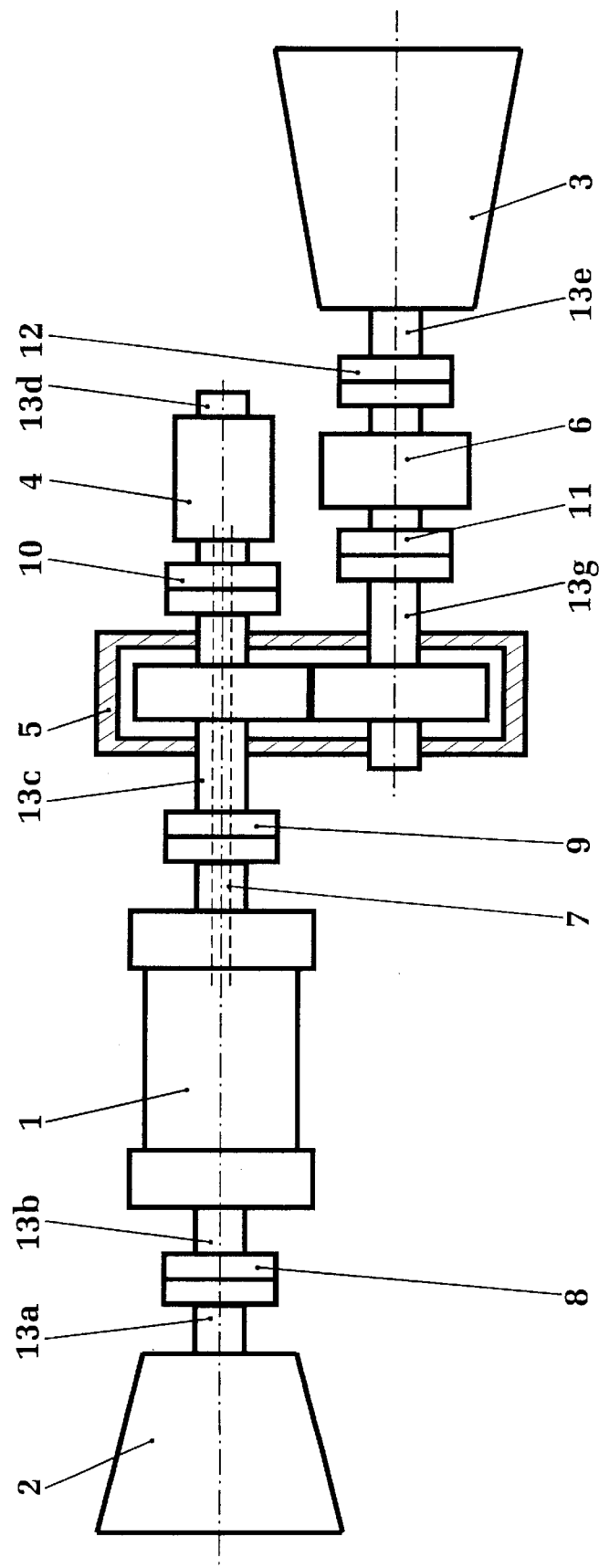
FIG. 2 shows a schematic view of a generator with double driving machinery according to a second preferred embodiment of the present invention.

FIG. 2 shows principally the same installation configuration of the generator 1 with double driving machinery as described above in relation to the first preferred embodiment of the present invention. However, the difference is found in the coupling of the steam turbine 3 with the transmission gear 5. The steam turbine 3 is connected via a so-called synchronous coupling 6 or SSS coupling with the transmission gear 5. Such synchronous couplings 6 only permit an activation of the coupling between the first gear shaft 13g and the steam turbine shaft 13e when the same speed has been reached by each of the shafts. As would be appreciated by one of ordinary skill in the art, during the start-up phase of the generator 1, the steam turbine 3 is initially uncoupled.

While the invention has been described in detail with reference to preferred embodiments thereof, it will be apparent to one skilled in the art that various changes can be made, and equivalents employed, without departing from the scope of the invention. It would, for example, be feasible to couple the gas turbine 2 via another transmission gear with the generator 1. In this way, the gas turbine 2 also could be operated supersynchronously, and the other transmission gear then would function as a converter. It would also be conceivable to operate the steam turbine 3 supersynchronously, and to then design the transmission gear 5 correspondingly as a speed converter.

LIST OF REFERENCE SYMBOLS

1 Generator
2 Gas turbine
3 Steam turbine
4 Slip ring unit
5 Transmission gear
6 Synchronous coupling
7 Excitation conductor
8–12 Coupling
13a Gas turbine shaft
13b Generator shaft
13c, g Gear shaft
13d Slip ring shaft
13e Steam turbine shaft
13f Intermediate shaft

What is claimed is:

1. A generator with a double driving machinery, comprising:
   a first and a second driving machine mechanically coupled to the generator via a generator shaft, the first and the second driving machine each provided with at least one mechanical coupling situated between the driving machine and the generator;
   a slip ring unit including a slip ring shaft mechanically coupled to the generator via the generator shaft; and
   a first gear shaft of a transmission gear provided between the generator shaft and the slip ring shaft, and a second gear shaft of the transmission gear being connected to the second driving machine.

2. The generator as claimed in claim 1, wherein the first driving machine is a gas turbine including a gas turbine shaft and the gas turbine shaft is connected via a first coupling with the generator shaft.

3. The generator as claimed in claim 1, wherein the second driving machine is a steam turbine including a steam turbine shaft.

4. The generator as claimed in claim 1, wherein between the second gear shaft and the second driving machine an intermediate shaft is arranged.

5. The generator as claimed in claim 1 wherein between the second gear shaft and the second driving machine a synchronous coupling is arranged.

6. The generator as claimed in claim 1, wherein the generator shaft, the first gear shaft, and the slip ring shaft are at least partially hollow shafts in which an excitation conductor is arranged.

7. The generator as claimed in claim 2, wherein the second driving machine is a steam turbine including a steam turbine shaft.

8. The generator as claimed in claim 7, wherein between the second gear shaft and the second driving machine an intermediate shaft is arranged.

9. The generator as claimed in claim 2, wherein between the second gear shaft and the second driving machine an intermediate shaft is arranged.

10. The generator as claimed in claim 7, wherein between the second gear shaft and the second driving machine a synchronous coupling is arranged.

11. The generator as claimed in claim 2, wherein between the second gear shaft and the second driving machine a synchronous coupling is arranged.

12. The generator as claimed in claim 7, wherein the generator shaft, the first gear shaft, and the slip ring shaft are at least partially hollow shafts in which an excitation conductor is arranged.

13. The generator as claimed in claim 2, wherein the generator shaft, the first gear shaft, and the slip ring shaft are at least partially hollow shafts in which an excitation conductor is arranged.

* * * * *